(12) United States Patent
Yde

(10) Patent No.: US 7,485,035 B1
(45) Date of Patent: Feb. 3, 2009

(54) CONTROL SYSTEM FOR AN ADJUSTABLE DEFLECTOR

(75) Inventor: Luc Yde, Oost Vluanderen (BE)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 11/904,711

(22) Filed: Sep. 28, 2007

(51) Int. Cl.
*A01F 12/30* (2006.01)

(52) U.S. Cl. ..................................... 460/111

(58) Field of Classification Search ............. 460/111, 460/112, 76, 79, 66, 901; 241/186.3; 56/503
See application file for complete search history.

(56) References Cited

U.S. PATENT DOCUMENTS

| | | | | |
|---|---|---|---|---|
| 3,677,540 A | * | 7/1972 | Weiss | 222/23 |
| 3,792,709 A | * | 2/1974 | Johnson et al. | 137/47 |
| 3,910,285 A | | 10/1975 | Sietmann | 130/24 |
| 4,056,107 A | * | 11/1977 | Todd et al. | 460/112 |
| RE31,257 E | * | 5/1983 | Glaser et al. | 460/80 |
| 4,383,536 A | | 5/1983 | Delorme | 130/27 R |
| 4,489,734 A | * | 12/1984 | Van Overschelde | 460/81 |
| 4,510,948 A | | 4/1985 | Dekeyzer | 130/27 R |
| 4,677,991 A | | 7/1987 | Harris et al. | 130/27 AE |
| 4,685,619 A | | 8/1987 | Harder, deceased | 239/1 |
| 4,875,889 A | | 10/1989 | Hagerer et al. | 460/1 |
| 5,569,081 A | * | 10/1996 | Baumgarten et al. | 460/112 |
| 6,209,808 B1 | | 4/2001 | Anderson | 239/682 |
| 6,331,142 B1 | * | 12/2001 | Bischoff | 460/112 |
| 6,547,169 B1 | * | 4/2003 | Matousek et al. | 239/661 |
| 6,656,038 B1 | * | 12/2003 | Persson | 460/112 |
| 6,685,558 B2 | | 2/2004 | Niermann et al. | 460/111 |
| 6,729,953 B2 | * | 5/2004 | Bueermann | 460/112 |
| 6,736,721 B2 | | 5/2004 | Niermann et al. | 460/112 |
| 6,783,454 B2 | | 8/2004 | Bueermann | 460/112 |
| 7,063,613 B2 | * | 6/2006 | Weichholdt | 460/112 |
| 7,186,179 B1 | | 3/2007 | Anderson et al. | 460/111 |
| 2003/0114207 A1 | * | 6/2003 | Wolters et al. | 460/111 |
| 2003/0190939 A1 | | 10/2003 | Bueermann | 460/111 |
| 2004/0029624 A1 | | 2/2004 | Weichholdt | 460/112 |
| 2005/0059445 A1 | | 3/2005 | Niermann et al. | 460/112 |
| 2005/0101363 A1 | * | 5/2005 | Farley et al. | 460/112 |

OTHER PUBLICATIONS

Issac U.S. Appl. No. 11/712,047. filed Feb. 28, 2007.

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A control system, and the method of use thereof, for controlling the positioning of an adjustable deflector employed to transition or redirect a flow of crop residue from an axially arranged threshing or separating system of an agricultural combine to and through a chopper assembly and into a crop residue distribution system for distributing the residue onto a field, and more particularly, to a control system that is responsive to changes in the amounts of crop residue being distributed by side-by-side spreader assemblies of the crop residue distribution system to alter the positioning of the adjustable deflector to change the flow of crop residue and to more closely balance and equalize the amounts of crop residue being distributed by the side-by-side spreader assemblies of the crop residue distribution system.

21 Claims, 6 Drawing Sheets

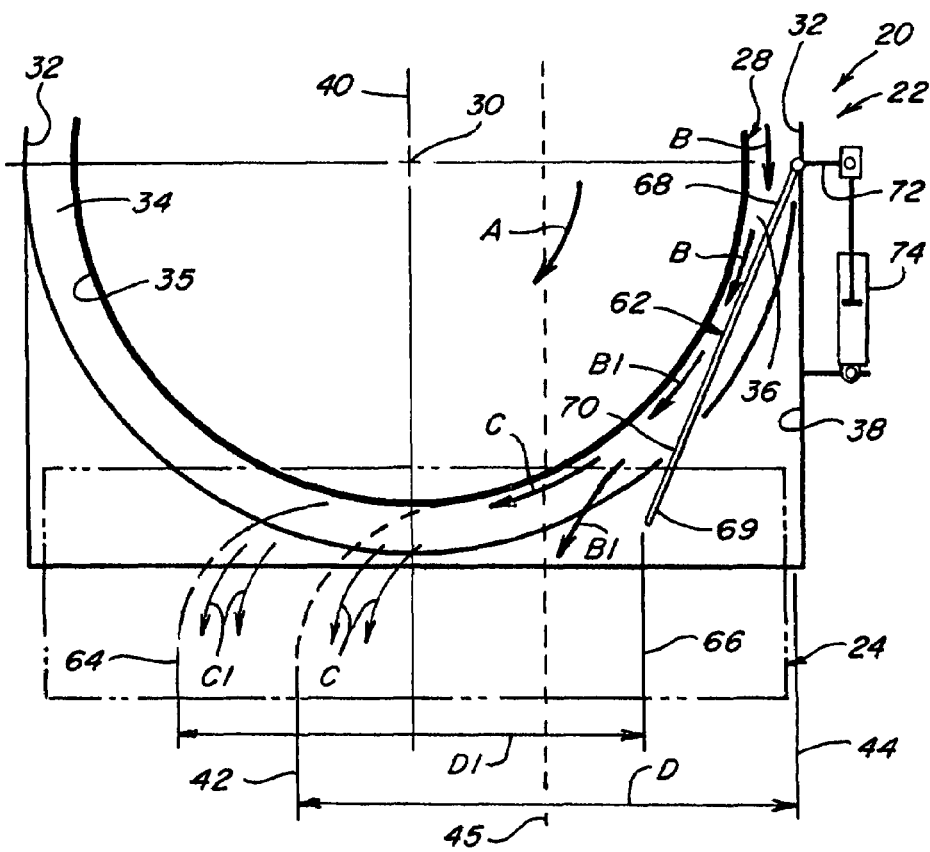
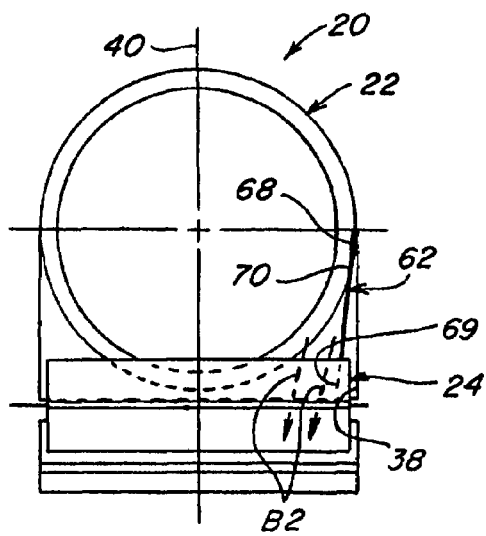
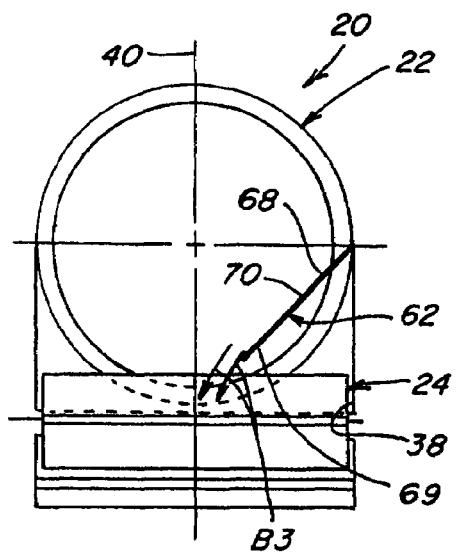

CONTROL SYSTEM FOR AN ADJUSTABLE DEFLECTOR

TECHNICAL FIELD

This invention relates generally to a control system, and the method of use thereof, for controlling the positioning of an adjustable deflector employed to transition or redirect a flow of crop residue from an axially arranged threshing or separating system of an agricultural combine to and through a chopper assembly and to a crop residue spreading system for distributing the residue onto a field, and more particularly, to a control system that is responsive to changes in the amounts of crop residue being distributed by side-by-side spreader assemblies of the crop residue spreading system to alter the positioning of the adjustable deflector to change the flow of crop residue and to more closely balance and equalize the amounts of crop residue being distributed by side-by-side spreader assemblies of the crop residue distribution system.

BACKGROUND ART

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a concave or cage, the rotor and surrounding concave being oriented so as to extend forwardly to rearwardly within the combine.

In operation, crop material is fed or directed into a circumferential passage between the rotor and the concave, hereinafter referred to as a rotor residue passage, and is carried rearwardly along a generally helical path in such passage by the rotation of the rotor as grain is threshed from the crop material. The flow of crop residue or MOG remaining between the rotor and concave after threshing is typically discharged or expelled by the rotating rotor at a rear or downstream end of the rotor and the rotor residue passage in a generally downward, or a downward and sidewardly, direction, in what is a continuation of the helical path of movement of the crop residue within the rotor residue passage between the rotor and concave.

Such flow thus proceeds from the rotor residue passage into a discharge opening at the downstream end of the rotor and into a further discharge passage that extends downwardly and somewhat rearwardly into a crop residue treatment and distribution system located below and rearwardly of the rear end of the threshing system. Such crop residue treatment and distribution system typically includes a rotary beater or chopper or other apparatus, hereinafter generally referred to as a rotary residue chopper, that processes the residue to reduce it to smaller pieces and propels such finer residue rearwardly within a rear end of the combine for either discharge from the combine through a rear opening onto a field, such as for windrowing, or into a spreader assembly, hereinafter referred to more simply as a spreader, for distribution thereby, such as in a swath on the field. In many typical applications, the spreader may include and utilize a pair of counter-rotating spreader head assemblies, typically driven by hydraulic spreader or drive motors, disposed in a side-by-side arrangement, to spread the crop residue flow that is being provided thereto from the rotary residue chopper. In some instances, a further chopper may also be included as part of the spreader to reduce the crop residue into still smaller particles before distribution by the counter-rotating spreader head assemblies.

Due to the nature of operation of the rotor, the design of the rotor and concave, and the helical movement of the crop residue within the rotor residue passage, the flow of crop residue from the rotor residue passage into the discharge opening is often greater on the downward sweep side of the rotor than on the upward sweep side, as a consequence of which the resulting crop residue flow across the width of the discharge opening is often uneven across the width of the discharge opening. Such uneven flow has often, in the past, been permitted to proceed through the discharge passage to the rotary residue chopper and therethrough to the crop residue spreading system.

When crop residue is to be spread over a field, the width of the header, it is often considered desirable that the crop residue be distributed as evenly or uniformly over the field as possible. Such uniformity of distribution is desirable because uneven crop residue distribution on a field can lead to temperature and moisture gradients detrimental to even growth of future crops on the field. Uneven distribution can make it difficult for crops to utilize nutrients and can impact the effectiveness of agricultural chemicals. Moreover, large discontinuities of crop residue can lead to plugging and other functional problems with tillage and/or planting equipment.

One factor that has been found to significantly affect the ability of a spreader to distribute crop residue evenly or uniformly over a field has been the transverse or side-to-side variation in the crop residue inflow into and through the rotary residue chopper and to the spreader. In such regard, it has been found that when the amount of crop residue presented at or to one side of the rotary residue chopper has been about equal to the amount of crop residue presented at or to the other side of the rotary residue chopper, a more even and uniform distribution of crop residue in a swath on a field can be achieved by the side-by-side operation of the spreader head assemblies. On the other hand, when the presented amounts are unequal or unbalanced, the distribution onto the field has been more uneven and less uniform.

It has also been found that the side-to-side introduction of crop residue from the rotor into the discharge opening and to the crop residue chopper can be affected by a variety of variables and conditions. Generally, residue from different crops, such as wheat and corn, will flow differently, and different rotor rotation speeds will typically be used for different crops. For example, small grains such as wheat and other grasses will typically be threshed at a relatively high rotor speed, for instance, 600 to 1000 revolutions per minute (rpm), and will produce residue containing a large volume of small stalks of straw, whereas corn will typically be threshed at a relatively slow rotor speed, for instance, less than 400 rpm, and produce crop residue containing a mixture of bulky stalk segments, cob fragments and large leaves. For a given crop, differences in plant maturity and weather conditions can affect size, moisture content, and other characteristics of crop residue so as to have varying flow and distribution characteristics.

Due at least in part to the above described variables and conditions, it has been observed that the transition of crop residue flow from the threshing system to the crop residue treatment and distribution system can vary significantly from harvesting operation to harvesting operation, and even during the course of a given harvesting operation. In particular, the side-to-side distribution of the crop residue flow as it proceeds from the rotor residue passage into the discharge opening and towards the rotary residue chopper may often be variable, that is, the flow to one side of the chopper may be heavier than to the other side, such that the chopper will propel more crop residue towards one side of the following spreader, resulting, in turn, in uneven crop residue distribution over a swath on the field being harvested.

Several devices and constructions have been developed in attempts to address the foregoing problems, including the adjustable deflector constructions such as are described in U.S. Pat. No. 7,186,179 and co-pending U.S. patent application Ser. No. 11/712,047, which are incorporated herein by reference thereto. The deflector constructions of such applications have been positioned with a deflector plate thereof hingedly or pivotally mounted at the downstream end of the rotor, and adjustment thereof to effect a redistribution of the crop residue at such location, upstream from the rotary residue chopper, has generally been effected either manually or by a positioning control system operated by a user.

It has been recognized that, in view of the variability of the crop residue flow in differing situations and with different crops, improved performance and reliability can be achieved by adjusting the position of such a deflector plate from time to time during operation of the combine so as to better balance and equalize the amounts of crop residue being distributed by the side-by-side spreader assemblies of the crop residue spreading system under then-attendant conditions. To this point in time, however, any adjustment has typically required or been as a result of human intervention by a user at such times as the user deems appropriate, either in the manual adjustment by the user of the deflector plate or by operation of a positioning control system in response to an input of some type by the user or operation by such user of a control element, such as a control button or switch.

Consequently, unless or until a user or operator has observed that the spread of the crop residue has become unbalanced, the adjustable deflector has typically been maintained in an established position, which position may not have been an ideal position over a period of time for directing the flow of crop residue from the threshing system to effect a balanced spreading of the crop residue by the spreader head assemblies of the spreader. What has therefore continued to be sought has been a system and method for better controlling the positioning of an adjustable deflector for effecting better balancing and equalization of the amounts of crop residue being distributed by the side-by-side spreader assemblies of the crop residue spreading system, preferably on an automated basis and without the need for operator intervention.

SUMMARY OF THE INVENTION

What is now disclosed is a control system, and method of use thereof, that is automatedly operable to alter the positioning of the adjustable deflector to change the flow of crop residue and to more closely balance and equalize the amounts of crop residue being distributed by side-by-side spreader assemblies of the crop residue distribution system. Such control system includes a plurality of sensors that monitor on a continuous basis side-to-side crop residue flow, an actuator mechanism operable to effect an adjustment in the positioning of the deflector, and a controller assembly operatively connected or coupled to the sensors to receive data signals therefrom as input data and operatively connected or coupled to the actuator mechanism to provide positioning control signals thereto. The crop residue flow is monitored such as by monitoring the operation of the spreader head assemblies, especially such as by monitoring, through the use of pressure transducers, the hydraulic pressures associated with the respective hydraulic motors for the spreader head assemblies.

When the flow of crop residue through the spreader is approximately balanced relative to the spreader head assemblies of the spreader, the respective hydraulic motors will be approximately similarly loaded and the hydraulic pressures associated with such hydraulic motors will be approximately the same. So long as the monitored pressure levels for the respective hydraulic spreader motors remain generally the same, or within some given differential amount, which differential amount may be determined by or a factor of the characteristics of the system and its components or otherwise set or determined by a user, the flow is considered to be in balance, with no adjustment of the positioning of the deflector being necessary. However, if the monitored pressure levels differ by more than the differential amount, the controller assembly, which can take many forms, including that of a circuit formed from discrete components, a packaged component, a circuit board, or other appropriate processing control, including a microprocessor, will provide to the actuator mechanism an appropriate signal to effect operation by the actuator mechanism to retract or extend the deflector plate to effect a change in the flow of crop residue from the threshing system to and through the rotary residue chopper to the spreader head assemblies of the spreader. Preferably, to prevent untoward cycling in the positioning of the deflector plate, further adjustments will not thereafter be countenanced until an adjustment delay time, which may optionally be selected by a user, is exceeded.

BRIEF DESCRIPTION OF THE DRAWINGS

FIG. 5 is a simplified rear view similar to FIG. 2, but showing the adjustable deflector plate partially extended into the flow of crop residue from the threshing system and illustrating the effect of such deflector plate upon the flow.

FIG. 6 is a simplified rear view of the threshing system, adjustable deflector plate, and rotary residue chopper, showing the deflector plate in a minimally extended position beside a side of the combine.

FIG. 7 is another simplified rear end view of the threshing system, adjustable deflector plate, and rotary residue chopper, showing the deflector plate at an alternative, extended position in relation to the side of the combine.

DETAILED DESCRIPTION OF THE INVENTION

Figure 1:
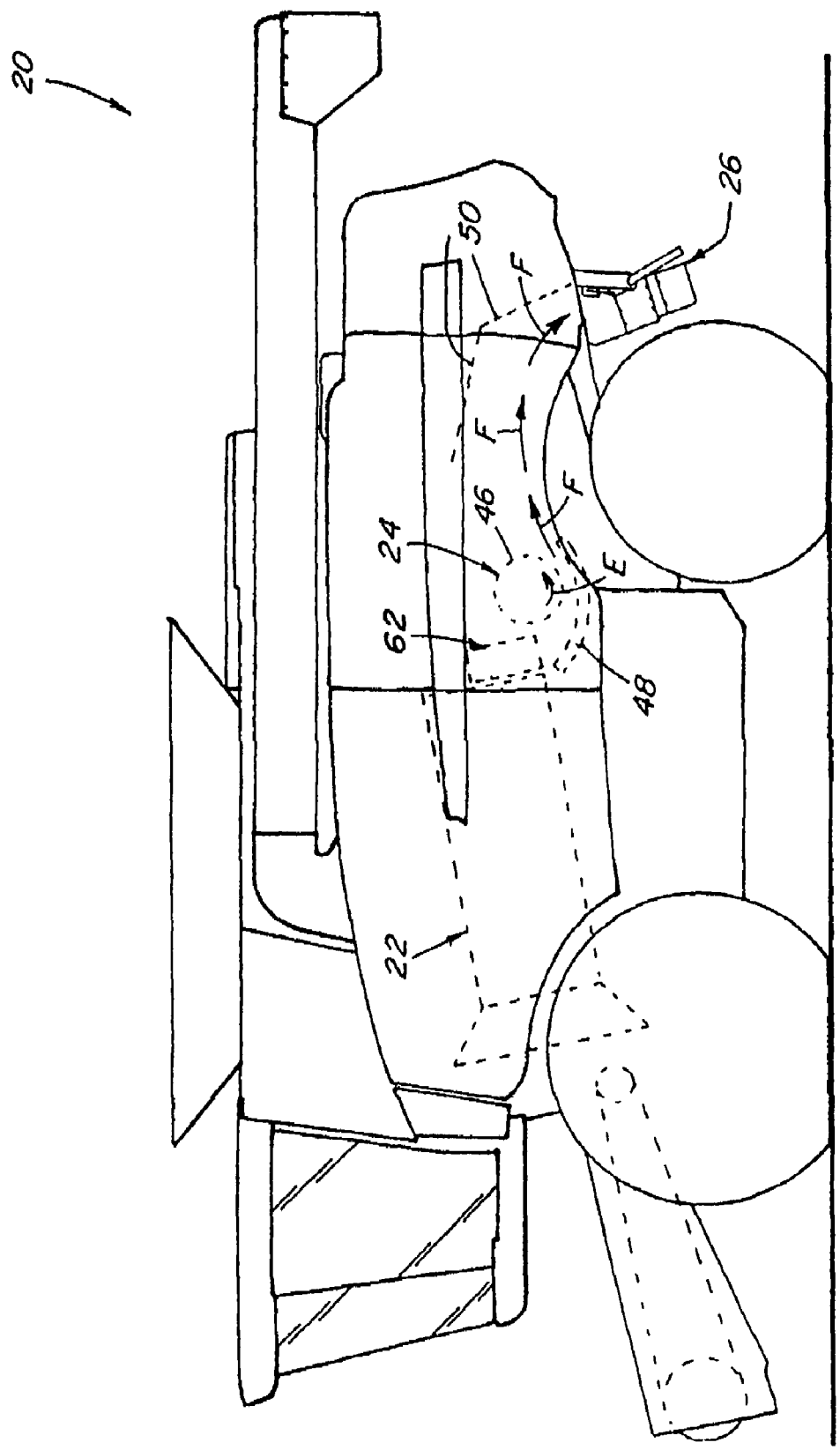
FIG. 1 is a simplified side view of an agricultural combine, illustrating in dotted lines an axially arranged threshing system of the combine, which combine includes an adjustable deflector apparatus for transitioning crop residue flow from the threshing system to a crop residue treatment and distribution system of the combine.

Referring now to the drawings, wherein like numerals refer to like items, FIG. 1 depicts a representative agricultural combine 20 that includes an axially arranged threshing system 22, a rotary residue chopper 24, and a crop residue spreader 26, all of well known construction and operation.

Figure 2:
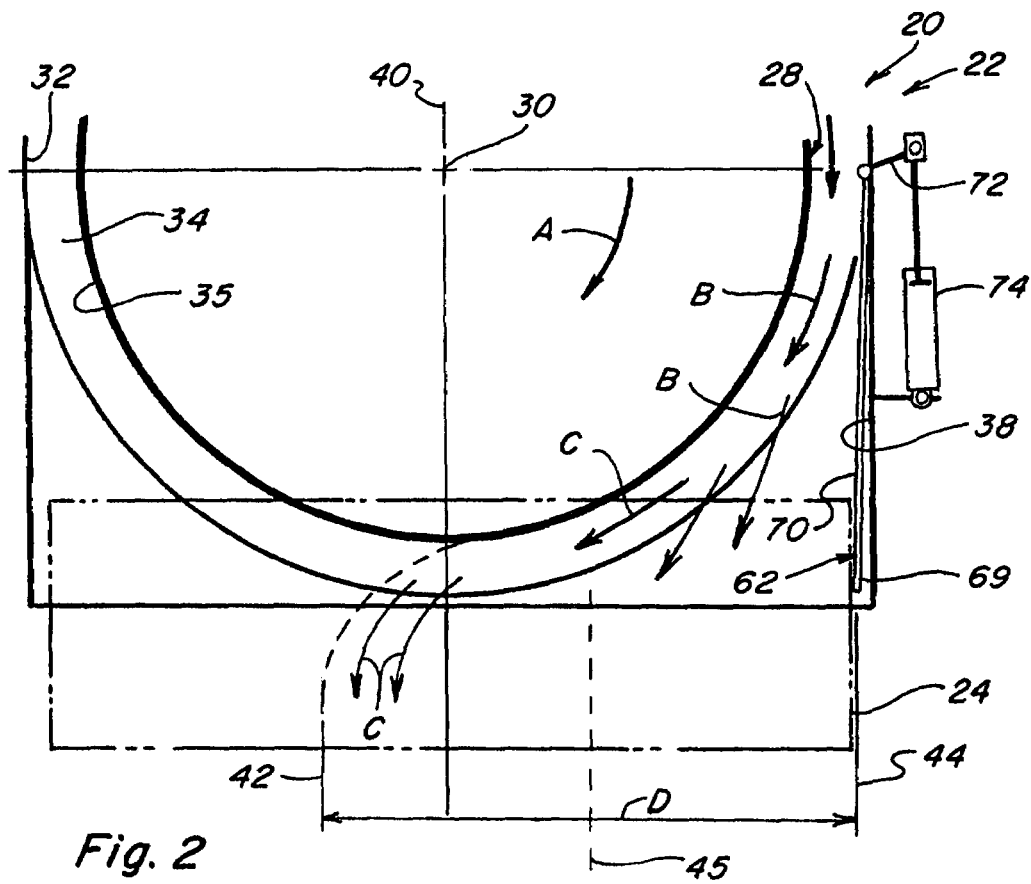
FIG. 2 is a simplified rear view at the rear of the threshing system of the combine of FIG. 1, showing the adjustable deflector apparatus generally abutting a side wall in a non-extended position and illustrating the path of crop residue flow expelled from the threshing system with the deflector plate in such position, with the position of the rotary residue chopper being shown generally in dashed lines.
Figure 3:
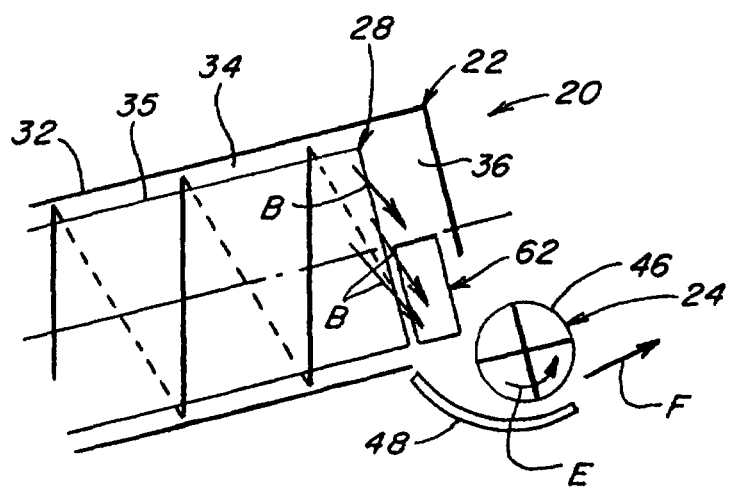
FIG. 3 is a simplified side view of the threshing system, adjustable deflector plate, and rotary residue chopper.

As can be generally and essentially observed from a review and study of FIGS. 1-3, threshing system 22 is axially arranged in that it includes a cylindrical rotor 28 conventionally supported and rotatable in a predetermined direction, with arrow A in FIG. 2 denoting a typical clockwise, or forward, rotation, about a rotational axis 30 therethrough and within a concave 32, for conveying a flow of crop material in a helical flow path through a space 34 extending circumferentially around an outer cylindrical surface 35 of rotor 28 and an inner circumferential surface of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 3, the crop residue will continue along a helical path through space 34, and will be expelled therefrom, as denoted by arrows B, into and through a discharge opening 36, which essentially comprises an extension of space 34 at the downstream end of rotor 28. Some of the flow expelled through discharge opening 36 will tend to be directed more downwardly, as denoted by arrow B on the right hand side of FIG. 2, so as to flow generally downwardly along internal side 38, while other portions of the flow will be directed and/or be carried by rotating rotor 28 and momentum in a transverse direction toward an opposite internal side of combine 20, and will eventually flow, as denoted by arrows C, downwardly toward crop residue distribution system 24.

The consistency of the flow of crop residue, volume thereof, and extent or pattern thereof, will typically vary, and will be a function of a variety of conditions, including, but not limited to, the speed of rotation in direction A of rotor 28, crop type, plant maturity, moisture content, and weather conditions. As an example, rotor speeds can vary between just a few hundred rpm and over a thousand rpm. Wheat and other small grains will typically have relatively small crop residue components, whereas other grains, such as corn, will typically have larger components, such as thick stalk segments, cob fragments, and large leaves.

Typically, regardless of the particular crop being harvested, the downward flow of crop residue will be more to the right-hand side of a front-to-rear extending vertical centerline 40 of both the threshing system 22 and the rotary residue chopper 24, as may be observed in FIG. 2, which centerline will hereinafter be referred to as the system centerline. The sideward extent of such typical downward flow is represented by extent D in FIG. 2, and is generally bounded on the left-hand side by a line 42 extending generally downwardly on the left of centerline 40, and on the right hand side by a line 44 extending generally downwardly near internal side 38, generally centering such flow extent D about a flow centerline 45 that is offset from system centerline 40. The sideward or transverse locations of lines 42 and 44, and thus the transverse extent D of the downward flow, may vary somewhat due to one or more of the above-noted conditions and/or parameters.

Here, it should be noted that rotary residue chopper 24 will typically include a rotary device, such as a beater or chopper 46 (FIG. 3), rotatable in a direction E above a concave pan 48. Beater or chopper 46 typically rotates at a rapid speed, so as to be capable of accelerating and propelling a flow of crop residue rearwardly, as generally denoted by arrows F, within the confines of the rear end of combine 20, and may have associated therewith a rank of fixed knives through which rotating knife elements on the rotary device pass. The rearward flow of crop residue from the beater or chopper 46 is typically guided and directed by internal panels or shields, generally denoted by shields 50 (FIG. 1), so as to either flow into a crop residue spreader 26 or through a rear opening so as to be deposited directly onto a field.

Figure 4:
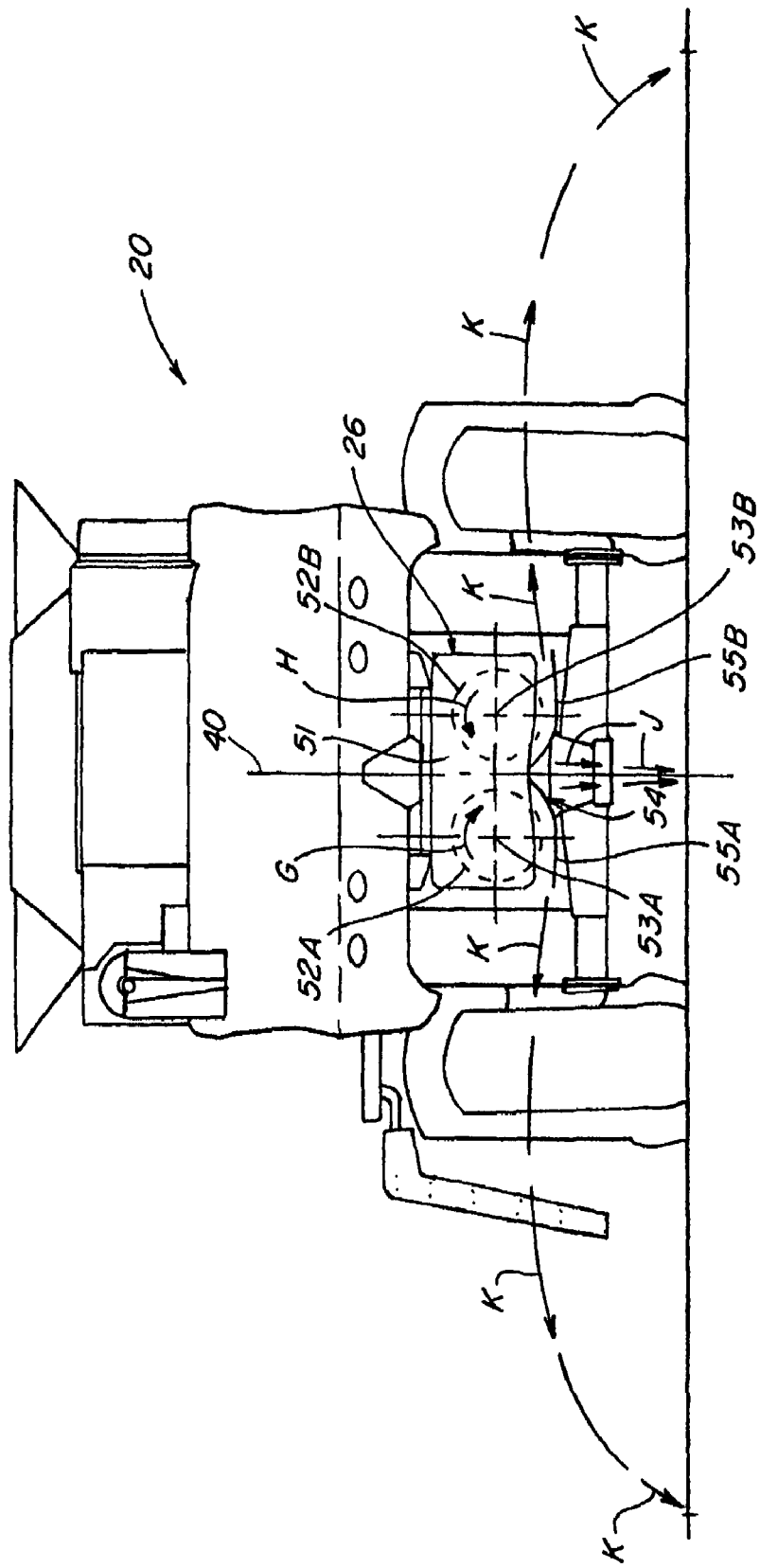
FIG. 4 is a rear view of the combine of FIG. 1, generally depicting a typical crop residue spreading system and certain components thereof as disposed at the rear of the combine.

Typically, a residue spreader 26 to which the crop residue is provided will be operated so as to distribute the crop residue in a layer the width of a header being harvested by combine 20 in a well known manner. In such regard, FIG. 4 depicts one form of a spreader 26 which can be advantageously employed, wherein, for purposes of clarity, certain elements or components associated with the rear or aft portion of the back sheet or back plate of the residue spreader 26 are not necessarily shown. The depicted spreader 26 includes spaced, opposed radial side walls, and a rear wall 51, sometimes referred to as the back sheet or back plate of the spreader, extending therebetween across the width of spreader 26, defining an internal cavity having a forwardly and upwardly facing inlet opening for receiving the residue flow from the rotary residue chopper 24, a pair of side-by-side counter-rotating spreader head assemblies 52A and 52B rotatable in opposite predetermined rotational directions, such as denoted by arrows G and H, about respective rotational axes 53A and 53B, and a flow distributor apparatus 54 disposed within the housing for spreader 26 generally abutting back sheet 51 and having opposed depending wing or arm portions 55A and 55B extending generally beneath portions of the spreader head assemblies 52A and 52B. As the spreader head assemblies rotate, a portion of the crop residue drops or is propelled generally downwardly, as denoted by arrow J, for distribution on the field behind the combine 20, and other portions are propelled more sidewardly and/or towards the flow distributor 54. Flow distributor 54 serves to further guide and carry portions of the crop residue intercepted thereby further sidewardly outwardly away from spreader 26, as denoted by oppositely directed arrows K, for distribution on the field behind the combine 20.

Figure 8:
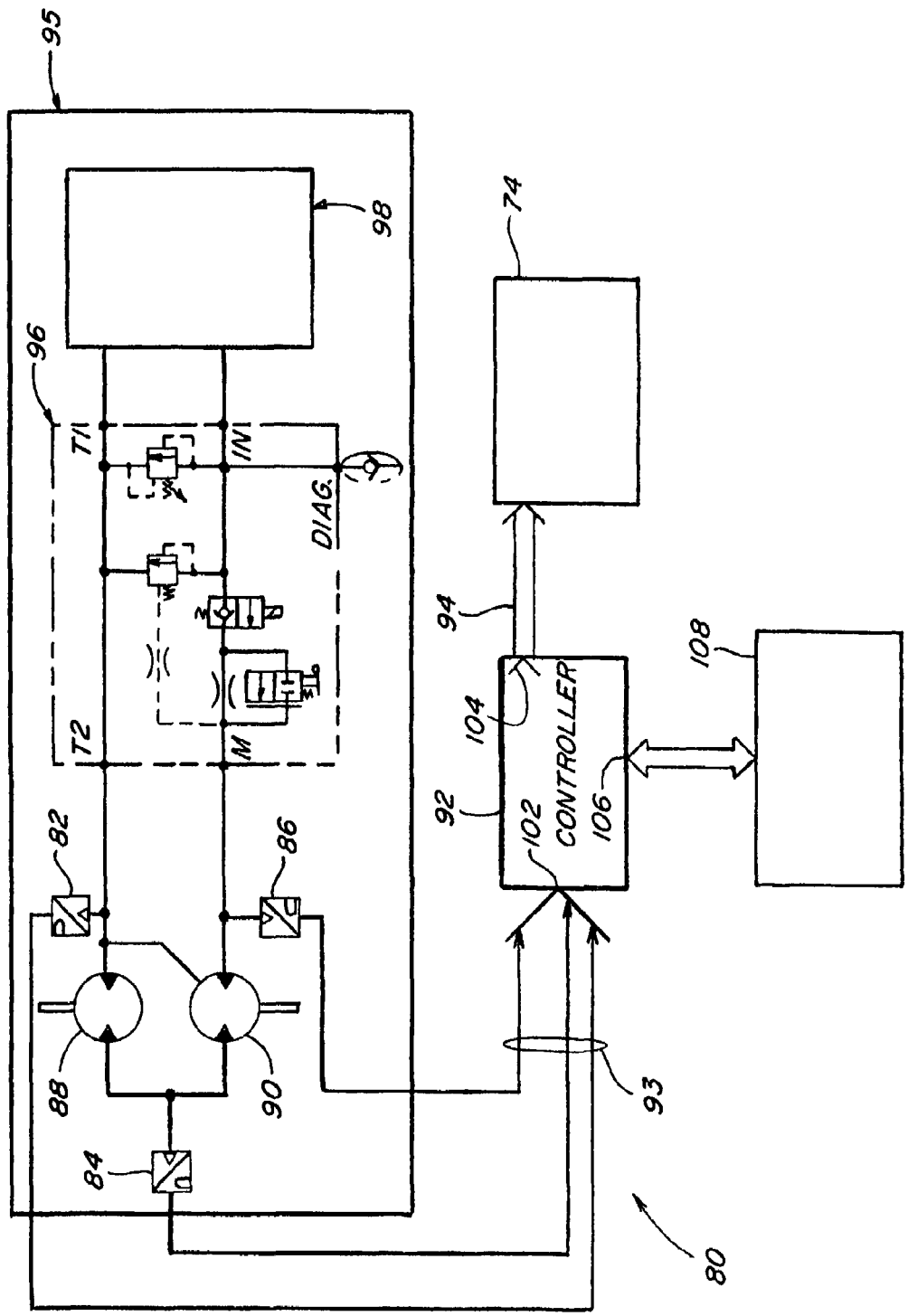
FIG. 8 is a generalized schematic of a preferred form of the control system of the present invention.

The spreader head assemblies 52A and 52B, which may also form or include spreader paddles of appropriate sizes and configurations for the uses intended, are rotated by suitable driving elements, such as by conventionally constructed and operable hydraulic motors, an electric motor, belt, or the like, again in well known manners, as will be further addressed hereinafter, especially with regard to FIG. 8. Rotational axes 53A and 53B extend at least generally in the fore and aft directions, that is, generally forwardly and rearwardly with respect to combine 20, and are generally horizontal or oriented at a small acute angle to horizontal, depending on an orientation or tilt of spreader 26 on combine 20, which can be optionally variable and adjustable in the well known manner.

Other well known spreader constructions, including spreaders that employ counter-rotating spreader head assemblies that rotate about generally vertical axes to propel the crop residue backwardly and sidewardly can also be employed, as can various other forms of drop or like spreaders, to achieve similar or alternative effects.

Regardless of the particular form of spreader utilized, as has been noted hereinabove, it is generally desired that the crop residue be distributed evenly or uniformly over the field, for a variety of reasons, important among which are the effectuation of penetration of chemicals and fertilizers applied over the field through the crop residue layer onto the underlying field and the effectuation of uniform emergence of subsequently planted crops. However, heavier flow of crop residue into one side or the other of the rotary residue chopper 24 will result in the beater or chopper 46 thereof propelling more crop residue toward a corresponding side of the following residue spreader 26 and one of the spreader head assemblies 52A or 52B, with the result of the deposit of a heavier layer or mat of crop residue on a corresponding side of a swath over a field. For the reasons set forth above, such uneven deposit of crop residue on a field is undesirable in many instances.

Consequently, a deflector apparatus has been developed to address such problem and to provide a combine operator with the ability to adjust the side-to-side or transverse extent and location of crop residue flow into the crop residue treatment and distribution system of a combine. In FIGS. 2, 5, 6, and 7, a typical deflector apparatus of the type employed for such a purpose is depicted, which deflector apparatus includes an adjustable deflector plate 62 that is disposed to be adjustably movable into and out of the path of at least a portion of the crop residue flow B. Such deflector plate 62 is shown located such that, when it is adjustably positioned to extend into the path of crop residue flow B as in FIGS. 5-7, at least portions of the crop residue flow that would otherwise flow along or close to side 38 impinge or strike deflector plate 62 and, to various extents depending upon the particular positioning of deflector plate 62, are deflected downwardly thereby, as denoted by arrows B1, B2, and B3 in FIGS. 5, 6, and 7, respectively.

Significantly, the downwardly directed crop residue flow, as illustrated by representative arrows B1, B2, and B3, is shifted or moved in a transverse direction in the discharge opening 36, that is, more to the left of internal side 38 in such figures, depending on the transverse position and orientation of deflector plate 62. When FIG. 7 is compared to FIGS. 2, 5, and 6, it is apparent that the farther deflector plate 62 is moved or extended transversely away from side 38, the farther the downwardly directed crop residue flow is shifted in the transverse direction.

In FIG. 5, deflector plate 62 is shown moved from the position depicted in FIG. 2, to an intermediate position relative to FIGS. 6 and 7, which intermediate position, for purposes of further discussion and illustration, will be treated as being the position that yields the optimal side-to-side distribution of crop residue flow into rotary residue chopper 24 for the attendant harvesting conditions. When such deflector plate 62 is so extended into the flow path B of the crop residue, the crop residue flow path is redirected transversely, with the shifted downwardly directed flow B1 effecting a corresponding transverse shift of downstream portions of such flow, as illustrated by arrows C1. The overall transverse extent of such flow correspondingly moves from extent D, extending between lines 42 and 44, to extent D1, extending between lines 64 and 66. In such a manner, the transverse extent of the flow towards beater or chopper 46 of rotary residue chopper 24 can be moved or shifted laterally by greater or lesser amounts depending upon the extent of the deployment of deflector plate 62 into the path of crop residue flow. The side-to-side distribution of crop residue at the inflow to chopper 46 can thus be adjusted so as, for example, to better align the flow centerline with the system centerline 40 instead of with an offset centerline, such as the centerline 45 for flow extent D.

As is perhaps also best observed in FIG. 5, the typical adjustable deflector plate 62 is typically pivotally or hingedly mounted to combine 20 for pivotal movement through a range of positions, such as represented by the positions shown in FIGS. 2, 5, 6, and 7. Such deflector plate 62 is preferably constructed of a rigid, abrasion resistant material, such as sheet metal or the like, and includes an upper end portion 68 mounted at a suitable location, such as on internal side 38 at the downstream end of rotor 28 of threshing system 22, and includes a lower end portion 69 that extends downwardly from upper end portion 68. Such deflector plate 62 may be adjustably positionable to extend into the path of at least a portion of the flow B of crop residue so that face 70 thereof will be impinged or struck by the flow B so as to deflect such impinging crop residue somewhat sidewardly and downwardly in the above-described manner. To facilitate pivotal movement of deflector plate 62 relative to internal side 38, upper end portion 68 may typically include or be associated with a pair of pivot arms 72 that extend through appropriate passages in internal side 38 and pivotally connect with an actuator 74 operable for effecting pivotal movement of deflector plate 62 through a range of positions between about those shown in FIGS. 6 and 7.

Actuator 74 is preferably located external to threshing system 22 so as to be outside of the path of the crop residue flow. Such actuator 74 can be any suitable commercially available actuator device or system and is preferably remotely controllable, such as through the control system of the present invention, which may also include an override switch or other control in an operator cab of combine 20, which control system, as will be further discussed hereinafter, may employ a processor based controller or the like for effecting desired pivotal movements of deflector plate 62. In general, actuator 74, which may include systems or mechanism for converting control signals to effect operation thereof, can comprise any suitable actuator device, such as a fluid cylinder, a linear actuator, such as a dashpot or solenoid, a rotary actuator, or the like, operable for effecting the desired movements.

Due at least in part to the variables and conditions discussed hereinabove, the crop residue flow from the threshing system 22 will continue to vary during the course of a crop harvesting operation, as a consequence of which the deflector plate must be repositioned from time to time if a balanced crop residue flow to the spreader 26 is to be maintained. FIG. 8 depicts a preferred form of a control system 80 for automatedly controlling the positioning and repositioning of the deflector plate 62 over a period of time, which control system 80 includes a plurality of pressure transducers 82, 84, and 86, which transducers are connected to monitor the hydraulic pressures associated with the hydraulic motors 88 and 90 driving spreader head assemblies 52A and 52B, as well as the actuator 74 for repositioning deflector plate 62, a controller 92 operatively connected to receive data signals from the pressure transducers 82, 84, and 86 and responsive thereto to produce and to provide to the actuator 74 positioning control signals, and wired connectors 93 and 94 for providing the pressure sensor output signals from pressure transducers 82, 84, and 86 to controller 92 and the positioning control signals from controller 92 to actuator 74. Hydraulic motors 88 and 90 are typically operatively connected in a hydraulic system 95 through a spreader valve assembly 96 to a hydraulic pump and reservoir system 98 for operation in a well known manner to drive spreader head assemblies 52A and 52B. The pressure transducers 82, 84, and 86 are located to monitor the pressures at locations in the hydraulic system 95 from which pressure values corresponding to the operating pressures of the hydraulic motors 88 and 90 can be determined.

When the flow amounts of crop residue to the spreader head assemblies 52A and 52B of spreader 26 are approximately equal, as can be achieved by an appropriate positioning of deflector plate 62 in the manner discussed hereinabove, the operating pressures associated with the hydraulic motors 88 and 90 driving such spreader head assemblies 52A and 52B will also be approximately equal. However, if the crop residue flows to the spreader head assemblies 52A or 52B become unbalanced for some reason, such as due to uneven crop growth, and the harvesting thereof across the harvested width, with a greater amount of crop residue flowing to one or the other of the spreader head assemblies 52A or 52B, the pressure drops monitored across the associated hydraulic motors 88 or 90 driving such spreader head assemblies 52A and 52B will also become unequal, with a greater pressure drop being detectable across the more heavily loaded hydraulic motor 88 or 90. By appropriate operations of the actuator 74, corrective repositionings of the deflector plate 62 can be effected in the manners heretofore described to alter the crop residue flow path through the combine 20 and its crop residue treatment and distribution system and to redirect the flow so that the flows to the spreader head assemblies 52A and 52B will again be approximately equal and so that the monitored pressures associated with the hydraulic motors 88 and 90 will also again be approximately equal.

Control system 80 provides for the automated repositioning of the deflector plate 62, without the necessity for human manual intervention or action to effect such repositioning, under control of controller 92. Controller 92 may be or include a processing system, including a programmed microprocessor and associated components, or may be a special purpose or like component or assembly, having a data input interface 102 for receiving the pressure data inputs and a control output interface 104 at which the positioning control signals can be provided, and is so designed and configured to be responsive to the pressure data signals being received thereby to produce appropriate positioning control signals to rebalance the crop residue flow between the spreader head assemblies 52A and 52B. Preferably, the controller 92 will also have a user input interface 106, which may be operatively connected to receive operator inputs from an operator input/output (I/O) system 108, which system 108 may include devices such as a keyboard or keypad or other information entry devices, including switch or control knob settings, as well as display devices, to permit an operator to activate, de-activate, and to override the controller, as needs may dictate, or to set or to vary various system parameters, such as the acceptable differential hydraulic motor pressures allowable without corrective action or delay times to avoid active constant cycling.

Figure 9:
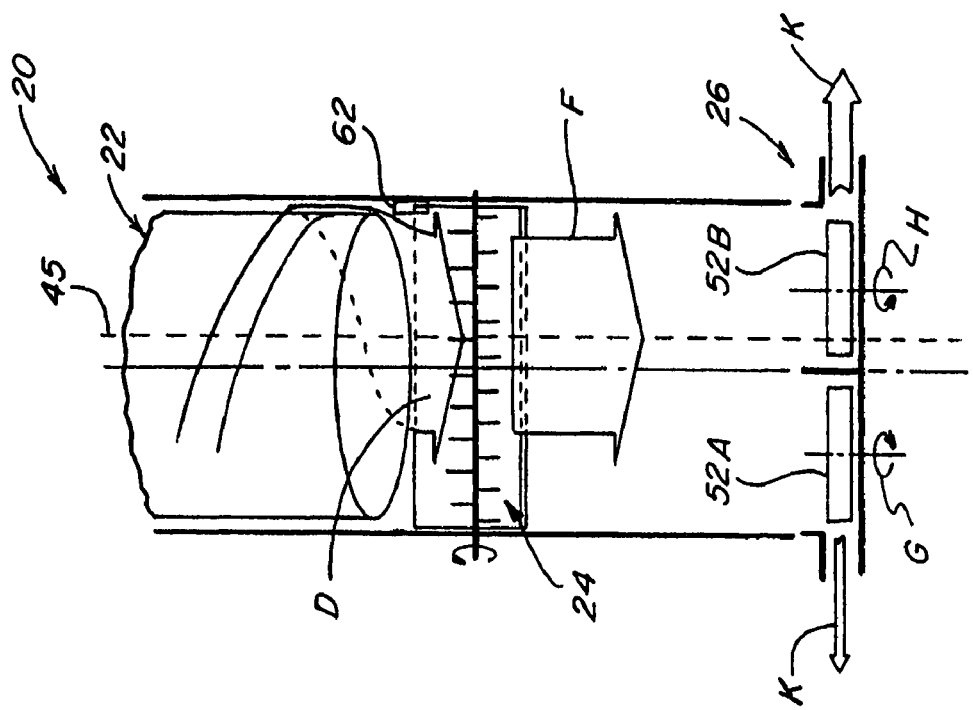
FIG. 9 is a simplified top view of the rear end of a combine, generally showing the threshing system, adjustable deflector plate, rotary residue chopper, and crop residue spreading system of the combine, and illustrating a typical crop residue flow through the rear end of the combine and the distribution thereby when the adjustable deflector plate is in a more retracted position.

Referring now to FIG. 9, such figure generally depicts typical crop residue flow characteristics that have previously been encountered with flow from an axially arranged threshing system 22 of a combine 20 into a rotary residue chopper 24, and from there, into and from a crop residue spreader 26, when the present invention has not been employed or activated and the deflector plate 62 has not been adjusted to effect balanced distribution of crop residue. It can be observed in such figure that flow D from threshing system 22 is centered about the flow centerline 45 which is offset from system centerline 40. With such configuration, the crop residue flow F that is then propelled rearwardly by rotary residue chopper 24 is similarly offset in the same direction and centered about centerline 45. Flow F flows into crop residue spreader 26 in the offset manner, and spreader 26, in turn, propels the crop residue from the rear end of combine 20 in an offset manner, with the heavier distribution being more to the right-hand side in such FIG. 9, as illustrated by the larger arrow K at the right-hand side and the smaller arrow K at the left-hand side. As a result, the crop residue is spread unevenly over a swath of the field.

Figure 10:
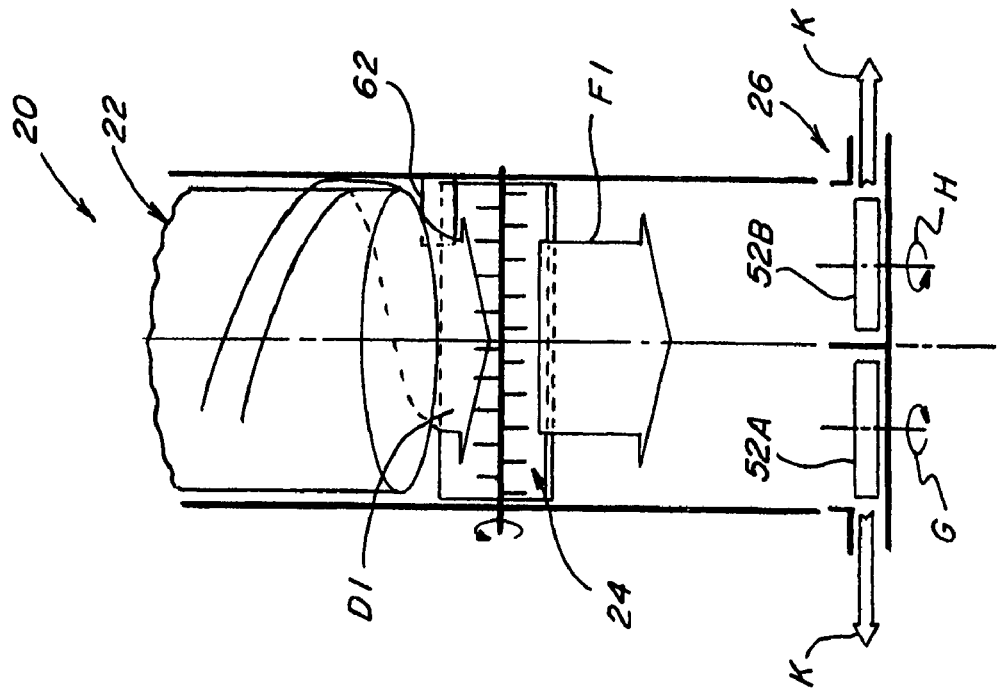
FIG. 10 is a simplified top view of a rear end of the combine, generally showing the threshing system, adjustable deflector plate, rotary residue chopper, and crop residue spreading system of the combine, and illustrating a typical crop residue flow through the rear end of the combine and the distribution thereby when the adjustable deflector plate is in a desired, more extended position.

In contrast, as depicted in FIG. 10, utilization of the present invention results in the automated ongoing repositioning of the deflector plate 62 to produce a deflection of the crop residue into a more centered crop residue flow D1 towards and into rotary residue chopper 24, and the consequent, more centered discharge of crop residue therefrom relative to system centerline 40, as is illustrated by the location of the center of arrow F1. The crop residue flow is therefore provided to spreader 26 in a more centered manner, and so as to be propelled from the rear end of combine 20 in a more centered relationship to system centerline 40, as is illustrated by arrows K which are of approximately the same size.

It should be appreciated that, while the preferred form of the invention has been described hereinabove with reference to hydraulic motors for driving the spreader head assemblies and the use of pressure transducers for monitoring the operating pressures of such hydraulic motors, other embodiments may be employed with electric motors or other drive devices for spreaders and their spreader head assemblies, and various sensors and monitors of other types could be equally as well employed, including speed, current, and voltage sensors of various types and monitors disposed to permit determination of the motor or drive loads, as could various types of flow sensors designed and positioned to monitor the side-to-side flow of the crop residue through the crop residue treatment and distribution system and the crop residue spreading system.

Additionally, instead of wired-bus connections and connectors, such as wired connectors 93 and 94, other forms of coupling mechanisms could be utilized to communicate sensor output signals to the controller 92 and to communicate positioning control signals to the actuator 74, including constructions for wireless transmission of RF signals, such as might be employed in and with Bluetooth environments and equipment, hydraulic or pneumatic systems, optical or infrared communications or connections, and mechanical linkages. Depending upon the particular form of coupling mechanism employed, the signals coupled to the data input interface 102 will generally correspond to the pressure output signals from the sensors 82, 84, and 86, but may not be identical to such pressure output signals. Similarly, depending upon the particular form of coupling mechanism employed, the signals coupled to the actuator 74 from the control output interface 102 will generally correspond to the positioning control signals produced by controller 92, but may not be identical to such positioning control signals.

In general, when a control system according to the present invention is activated or operated, it will automatedly monitor on an ongoing basis the side-to-side flow of the crop residue to the spreader and will be responsive to detected imbalances in such flow, at least to the extent that a detected imbalance exceeds some given value, to effect a repositioning of an adjustable deflector plate in the path of the crop residue flow to alter and redirect the flow to achieve a more balanced side-to-side flow. Typically, an imbalance will be considered to exist when the loads associated with motors driving side-by-side spreader head assemblies are found to differ, such as may be detected by monitoring the hydraulic pressures across hydraulic motors driving such spreader head assemblies.

Preferably, an operator will be able to vary the given value as needs dictate and will also be able to override the control system as may become necessary or desirable.

Additionally, in order to alleviate the problem of constant cycling in the repositioning of the deflector plate 62, the controller 92 may be so designed and configured to require the passage of some minimum period of time after a repositioning of the deflector plate 62 before the production of a new positioning control signal. Optionally, a user may be permitted to alter the minimum time delay by entry of time delay setting information at the operator input/output (I/O) system 108 and by the communication of such time delay setting information to user input interface 106 of controller 92. Information can be coupled from operator input/output (I/O) system 108 to user input interface 106 of controller 92 in manners similar to those addressed hereinabove relative to the coupling of pressure sensor signals to the controller 92 and the coupling of positioning control signals to the actuator 74.

In light of all the foregoing, it should thus be apparent to those skilled in the art that there has been shown and described a control system for automatedly controlling the positioning of an adjustable deflector in a harvesting combine and the method of operation of such control system. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A control system for automatedly controlling the positioning of an adjustable deflector plate employed in a harvesting combine to adjust and better balance the side-to-side flow of crop residue to a spreader associated with the combine and the distribution thereby, the deflector plate operably extendable into the flow of crop residue to redirect crop residue impinging the deflector plate, comprising:
    a plurality of sensors positionable to monitor conditions at given locations, said sensors producing sensor output signals corresponding to detected conditions at said given locations, information representative of crop residue flow at certain positions across the width of the crop residue flow determinable from said sensor output signals;
    an actuator operatively connectable to the deflector plate and operable to effect the extension of the deflector plate into the flow of crop residue; and
    a controller having a data input interface and a control output interface, said data input interface coupled to said sensors to receive at said data input interface data input signals corresponding to said sensor output signals, said controller responsive to said data input signals to produce positioning control signals at said control output interface, said control output interface coupled to said actuator to provide to said actuator deflector plate positioning signals corresponding to said positioning control signals;
    the actuator responsive to said deflector plate positioning signals coupled thereto from said controller to effect adjustments in the degree of extension of the deflector plate into the flow of crop residue,
    whereby the degree of extension of said deflector plate into the flow of crop residue is controllable over time to automatedly adjust the side-to-side flow of crop residue to the spreader;
    wherein the spreader includes a pair of side-by-side spreader head assemblies operable to distribute crop residue being provided thereto, wherein said sensors include sensors associated with the spreader head assemblies, wherein the spreader head assemblies are driven by respective drive motors, and further wherein said sensors associated with the spreader head assemblies are positionable to monitor conditions of the respective drive motors.

2. The control system of claim 1
    wherein the drive motors are hydraulic motors and
    wherein said sensors monitor the operating conditions of the hydraulic motors.

3. The control system of claim 2 wherein said sensors monitor hydraulic pressures associated with the drive motors.

4. The control system of claim 3 wherein said sensors include
    a first set of sensors connectable to monitor the hydraulic pressures at the input and output sides of one of the drive motors and
    a second set of sensors to monitor the hydraulic pressures at the input and output sides of the other of the drive motors.

5. The control system of claim 4 wherein said controller is operable to determine from data input signals the respective pressures across the respective drive motors, said respective pressures across the respective drive motors being representative of the loadings of the respective drive motors and of the respective amounts of crop residue then being provided to the respective drive motors.

6. The control system of claim 5 wherein said controller is responsive to said respective pressures across the respective drive motors to produce a positioning control signal when the differential between said respective pressures across the respective drive motors exceeds some predetermined value.

7. The control system of claim 6 wherein said actuator is responsive to said deflector plate positioning signal coupled to said actuator from said controller to effect a repositioning of the deflector plate into the flow of crop residue to redirect the flow of crop residue to the spreader to better balance the loadings of the drive motors.

8. The control system of claim 6 wherein said predetermined value is settable by an operator.

9. The control system of claim 8 wherein said controller includes a user input interface through which the operator can provide user input establishing said predetermined value.

10. The control system of claim 1 including a coupling mechanism coupling said sensor output signals to said data input interface of said controller and coupling said positioning control signals produced at said control output interface of said controller to said actuator.

11. The control system of claim 10 wherein said coupling mechanism includes
    a first wired-bus connection operatively connecting said sensors to said data input interface of said controller and a second wired-bus connection operatively connecting said output control interface of said controller to said actuator.

12. The control system of claim 1 wherein said controller includes a user input interface for receiving thereat information provided by a user to establish certain operating conditions of said controller, said user provided information including the minimum time delay between deflector plate repositionings, said controller operable after the production of a positioning control signal to delay the production of another positioning control signal until after said minimum time delay.

13. The control system of claim 1 wherein said controller includes a discrete circuit construction.

14. The control system of claim 1 wherein said controller includes an electrical processor.

15. The control system of claim 14 wherein said electrical processor is a programmed microprocessor.

16. A method of automatically controlling the positioning of an adjustable deflector plate of a harvesting combine, such combine having an associated spreader for distributing therefrom crop residue provided thereto, to adjust and better balance the side-to-side flow of crop residue to the spreader and the distribution thereby, the deflector plate being operably extendable into the flow of crop residue to redirect crop residue impinging the deflector plate, the method comprising
providing a control system including
a plurality of sensors positioned to monitor conditions at given locations, said sensors producing sensor output signals corresponding to detected conditions at said given locations, information representative of crop residue flow at certain positions across the width of the crop residue flow determinable from said sensor output signals,
an actuator operatively connected to the deflector plate and operable to effect the extension of the deflector plate into the flow of crop residue,
a controller having a data input interface and a control output interface, said data input interface coupled to said sensors to receive at said data input interface data input signals corresponding to said sensor output signals, said controller responsive to said data input signals to produce positioning control signals at said control output interface, said control output interface coupled to said actuator to provide to said actuator deflector plate positioning signals corresponding to said positioning control signals,
said actuator responsive to said deflector plate positioning signals coupled thereto from said controller to effect adjustments in the degree of extension of the deflector plate into the flow of crop residue,
activating said control system,
whereby said control system automatedly controls the positioning of the adjustable deflector plate to adjust and better balance the side-to-side flow of crop residue to the spreader associated and the distribution thereby,
wherein the spreader further includes a pair of side-by-side spreader head assemblies operable to distribute crop residue being provided thereto, wherein said sensors include sensors associated with the spreader head assemblies, wherein the spreader head assemblies are driven by respective hydraulic drive motors, and further wherein said sensors associated with the spreader head assemblies are positioned to monitor hydraulic pressures associated with the respective hydraulic drive motors.

17. The method of claim 16
wherein said controller is responsive to said determinable information representative of crop residue flow at said certain positions across the width of the crop residue flow to produce a positioning control signal when the differential between the crop residue flow at said certain positions exceeds some predetermined value,
wherein said controller of said control system includes a user input interface through which the operator can provide user input establishing said predetermined value, and
wherein said method includes the step of entry by a user of said predetermined value.

18. The method of claims 16
wherein said sensors include a first set of sensors connected to monitor the hydraulic pressures at the input and output sides of one of the hydraulic drive motors and a second set of sensors to monitor the hydraulic pressures at the input and output sides of the other of the hydraulic drive motors,
wherein said controller is operable to determine from data input signals the respective pressures across the respective drive motors, said respective pressures across the respective drive motors being representative of the loadings of the respective drive motors and of the respective amounts of crop residue then being provided to the respective drive motors, and
wherein said controller is responsive to said respective pressures across the respective hydraulic drive motors to produce a positioning control signal when the differential between said respective pressures across the respective hydraulic drive motors exceeds some predetermined value.

19. The method of claim 16 wherein said control system includes
a first wired-bus connection operatively connecting said sensors to said data input interface of said controller and
a second wired-bus connection operatively connecting said output control interface of said controller to said actuator.

20. The method of claim 16 wherein said controller of said control system includes a processing system operable to determine from said data input signals the comparative status of crop residue flow at said certain positions and to produce positioning control signals at said control output interface of said controller dependent at least in part upon said comparative status.

21. A method of configuring a harvesting combine, such combine employing an adjustable deflector plate for adjusting the side-to-side flow of crop residue through the combine to a spreader, the deflector plate being operably extendable into the flow of crop residue to redirect crop residue impinging the deflector plate, to provide the combine with the capability of automatedly controlling the positioning of the adjustable deflector plate to adjust and better balance the side-to-side flow of crop residue to a spreader associated with the combine and the distribution thereby, the method comprising
providing a control system including
a plurality of sensors positionable to monitor conditions at given locations, said sensors producing sensor output signals corresponding to detected conditions at said given locations, information representative of crop residue flow at certain positions across the width of the crop residue flow determinable from said sensor output signals, an actuator operatively connectable to the deflector plate and operable to effect the extension of the deflector plate into the flow of crop residue, a controller having a data input interface and a control output interface, said data input interface couplable to said sensors to receive at said data input interface data input signals corresponding to said sensor output signals, said controller responsive to said data input signals to produce positioning control signals at said control output interface, said control output interface couplable to said actuator to provide to said actuator deflector plate positioning signals corresponding to said positioning control signals, said actuator responsive to said deflector plate positioning signals coupled thereto from said controller to effect adjustments in the degree of extension of the deflector plate into the flow of crop residue, positioning said sensors at desired locations to monitor conditions at such locations, connecting said actuator to control the operation of the deflector plate, coupling said sensors to the data input interface of said controller, coupling the output control interface of said controller to said actuator, whereby said control system is installed for use in automatedly controlling the positioning of the adjustable deflector plate to adjust and better balance the side-to-side flow of crop residue to the spreader associated and the distribution thereby, wherein the spreader further includes a pair of side-by-side spreader head assemblies operable to distribute crop residue being provided thereto, wherein said sensors include sensors associated with the spreader head assemblies, wherein the spreader head assemblies are driven by respective hydraulic drive motors, and further wherein said sensors associated with the spreader head assemblies are positioned to monitor hydraulic pressures associated with the respective hydraulic drive motors.

* * * * *